United States Patent [19]

Benson et al.

[11] Patent Number: 4,785,669
[45] Date of Patent: Nov. 22, 1988

[54] ABSOLUTE CAPACITANCE MANOMETERS

[75] Inventors: Richard A. Benson, Bedford; John A. Denner, Lynn, both of Mass.

[73] Assignee: MKS Instruments, Inc., Andover, Mass.

[21] Appl. No.: 50,898

[22] Filed: May 18, 1987

[51] Int. Cl.[4] .............................................. G01L 9/12
[52] U.S. Cl. ..................................................... 73/718
[58] Field of Search ..................... 73/724, 718; 361/283

[56] References Cited

U.S. PATENT DOCUMENTS

| | | | |
|---|---|---|---|
| 3,484,732 | 12/1969 | Postma | 73/720 |
| 4,390,925 | 6/1983 | Freud | 73/718 |
| 4,425,799 | 1/1984 | Park | 73/718 |
| 4,499,773 | 2/1985 | Crampton et al. | 73/718 |

Primary Examiner—Tom Noland
Assistant Examiner—Robert R. Raevis
Attorney, Agent, or Firm—James E. Mrose

[57] ABSTRACT

A single fluid-pressure transducer unit, of the type in which sensed electrical capacitance is varied in accordance with electrode deflections induced by pressure changes, is rendered capable of characterizing a wide range of pressures extending from near-vacuum to atmospheric levels, with the aid of a distinctive composite-electrode capsule which interacts uniquely with a conventional type of sheet-metal diaphragm. While sensing relatively low pressures, the exhibited capacitance of the transducer is essentially that appearing between the diaphragm and a nearby electrode carried by the capsule, but, at or near atmospheric pressure, the diaphragm physically engages and deflects that electrode, which is elastically deformable, causing it to vary a further capacitance appearing between that deformable electrode and a companion stationary electrode which is also part of the capsule.

16 Claims, 1 Drawing Sheet

ABSOLUTE CAPACITANCE MANOMETERS

BACKGROUND OF THE INVENTION

The present invention relates to improvements in capacitance-related measurement of fluid pressures, and, in one particular aspect, to unique high-performance absolute-pressure transducers in which widely-different ranges of pressures, such as those near vacuum and at or near atmospheric levels, are advantageously characterized by a single assembly of economical and uncomplicated construction wherein a main diaphragm functions distinctively both as a movable capacitance electrode over one of the ranges and as a means for mechanically inducing variations in a further capacitance array over another range.

It has become common practice to sense and provide related measurements of pressure, and especially very low levels of pressure, in terms of the capacitances exhibited between a pair of closely-spaced electrodes, one of which is adjusted in position relative to the other in accordance with differences in pressures acting upon an associated diaphragm. In the case of so-called "absolute" pressure capacitance manometers, one of the pressures, which is maintained as a reference, is substantially gasless and usually as close to a perfect vacuum as it is feasible and practical to establish and hold on one side of the diaphragm. However, if any such device is to be counted upon to sense and usefully characterize pressures which are very small, its design features, including a relatively close electrode spacing, tend to render it unsuitable for dependable indications of the much larger pressures appearing at or near ambient atmospheric levels. Yet, reliable knowledge about such ambient pressures is commonly quite important to the user, who, among other things, must be able to determine when once-evacuated sensitive systems, monitored precisely while at low pressures, are being brought back up to or near atmospheric levels at which system openings and "dumping" may be ventured safely. It is for such reasons that auxiliary thermocouple-type gages have been used to furnish system operators with at least coarse information about pressures near atmospheric, and that the highly-sensitive capacitance manometers have come to be used in tandem with similarly-constructed manometers designed to function at higher atmospheric-level pressures. The latter expedients involve costs, bulk and complexities which it would of course be advantageous to avoid.

SUMMARY OF THE INVENTION

The present teachings provide for capacitance-related characterizations of pressures over widely-disparate ranges. by way of but a single uncomplicated transducer. In a preferred physical expression of such a transducer, a planar sheet-metal diaphragm is interposed in a generally-conventional sealed mounting between an evacuated reference chamber and a port communicating with a site of pressures to be measured. That diaphragm itself serves as a capacitor electrode, and, in a routine fashion, is movably positionable relative to a further cooperating nearby relatively-stationary capacitor electrode located in the evacuated reference chamber, responsive to changes in the measured pressures. However, the relatively-stationary further capacitor electrode is in this instance an element of a unique composite structure wherein its insulating suppot comprises a flexible ceramic disc peripherally united with a rigid ceramic body carrying a still further capacitor electrode in closely-spaced relation to the disc. That composite structure, which is preferably in the form of a substantially monolithic ceramic capsule having the electrodes plated onto certain of its surfaces, lies wholly within the reference chamber and its flexible disc is not subjected to pressure differentials which might cause it to deflect and thereby vary capacitance between its electrodes; nevertheless, such disc deflections, and attendant variations in the capsule's capacitance, do occur, but, quite differently, as the result of wholly mechanical action of the metal diaphragm pressing against the disc. When some measured system pressures are in a very low range, such as 0–10 Torr, the transducer capacitance is mainly that exhibited betweem the metal diaphragm and disc electrode, but, when the system pressure approaches much higher atmospheric levels, the metal diaphragm will have responded by pressing against the flexible disc and forcing it to reduce the spacing between the capsule electrodes, so that their exhibited capacitance increases. The combined capacitances may thus distinctively characterize sensed pressure, from near zero to ambient in the one transducer.

Accordingly, it is one of the objects of this invention to promote unique and advantageous capacitance-manometer measurements across wide ranges of sensed pressures utilizing a single small multi-electrode assembly of simple low-cost construction in which there are two different types of responses to the pressures.

A further object is to provide a novel and improved absolute-pressure transducer which is alone capable of characterizing both a low sensitive range of pressures and the very much higher pressures near and at ambient atmospheric levels.

Still further, it is an object to reduce the complexity and difficulty of performing absolute-pressure measurements spanning widely different ranges, by way of a diaphragm-type transducer which uniquely cooperates with an electrode capsule in two ways, one involving the diaphragm acting wholly as a capacitor electrode and the other involving the diaphragm as a force-applying member which mechanically alters other capacitance appearing from within the capsule.

BRIEF DESCRIPTION OF THE DRAWINGS

Although the aspects of this invention which are considered to be novel are expressed in the appended claims, further details as to preferred practices and as to further objects and features thereof may be most readily comprehended through reference to the following detailed description when taken in connection with the accompanying drawings, wherein:

DESCRIPTION OF THE PREFERRED EMBODIMENT

Figure 1:
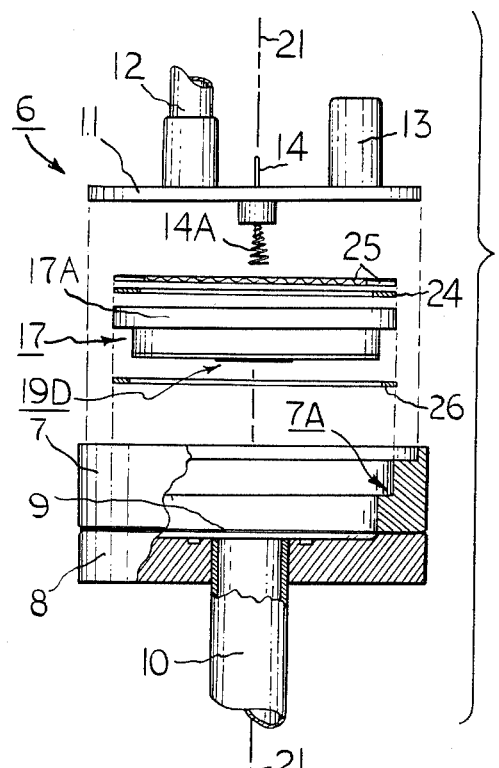
FIG. 1 is a side elevational view illustrating principal components of an improved absolute capacitance manometer in an "exploded" relationship along a central longitudinal axis, certain of the parts being cross-sectioned to further reveal details of construction.

Having reference to the drawings, wherein like numbers and characters designate identical or corresponding parts or features throughout the several views, and more particularly to FIG. 1 thereof, there are illustrated the various components which will, together, make up an improved absolute capacitance-type pressure sensor or cell, 6, in which the measurement range of the one unit extends from a sensitive low region of special interest near vacuum up to and including relatively high atmospheric pressures. In general form and size, the exterior, and much of the interior, of the assembly is advantageously virtually identical to what is found in a known prior capacitance manometer which serves but one limited range, and that is true, for example, of its joined (welded or otherwise bonded) metal main body parts 7 and 8, the thin planar sheet-metal diaphragm 9 held between and sealed with those body parts, the sealed fitting or pipe 10 through which one side of the diaphragm is fluid-coupled to some plenum and is thus exposed to site pressures which are to be characterized by the sensor, and a top metal cover 11 which is permanently joined to and sealed with the intermediate body part 7 and mounts the usual sealed off evacuation tube 12, getter provision 13 and insulated electrical leadthrough pin 14 associated with a low-force electrode-contacting spring 14A. The latter spring depends from what is the inner (lower) side of the cover, where it is disposed to lie within and connect with a capacitance electrode in an evacuated sealed chamber maintaining a near-vacuum reference-pressure condition on the upper side of the diaphragm 9.

Figure 2:
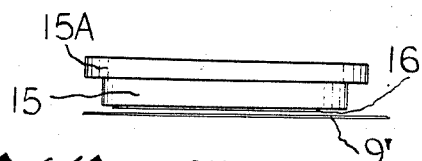
FIG. 2 shows a prior form of single-electrode carrier known in earlier pressure transducers, the exterior proportions of which carrier can be advantageously matched by a multiple-diaphragm multiple-electrode capsule unit in the improved absolute capacitance manometer.

An assembly of components such as those described next above has been and continues to be successfully used in association with a monolithic inner electrode structure like that of FIG. 2, where a shouldered disk-like solid ceramic insulating element 15 carries a plated metallic electrode layer 16 on its planar lower face, in spaced confronting relation to the upper planar surface of the nearby circular sheet-metal diaphragm 9' (corresponding to the aforementioned diaphragm 9). The diaphragm and coated metallic layer above it form electrodes of a capacitor whose exhibited capacitance at any time varies as a function of sensed pressure acting on the bottom of the diaphragm while a reference (near-vacuum) pressure acts on its opposite top surface; as the edge-restrained sealed diaphragm bows upwardly to greater extents with increased sensed pressures, its spacings from fixed electrode "plate" 16 diminish and thereby cause the capacitor to exhibit higher values of electrical capacitance which conventional auxiliary electronic circuitry then translates into displays characterizing those sensed pressures. Physical spacings are of course highly critical, inasmuch as their uncontrolled variations will occasion error, and precise dimensioning and mounting of shouldered ceramic element 15 in a body part such as 7 are therefore correspondingly critical. Accordingly, both the shoulder 15A and other portions of element 15 and the mating inner shoulder 7A and other dimensionally-correlated portions of the sensor body are fashioned with the closest practical tolerances. Taking advantage of established high-precision physical parameters already appearing in the design of the body and diaphragm structure for such a sensor, improvements offered by the present teachings are very beneficially expressed via a capsule-like composite electrode structure, 17, which on the outside looks much the same as the prior item 15 and which has a like shoulder 17A and is otherwise conveniently so identical in certain dimensions as to be substituted for it in a line of assembly of transducers covering various ranges.

Figure 4A:
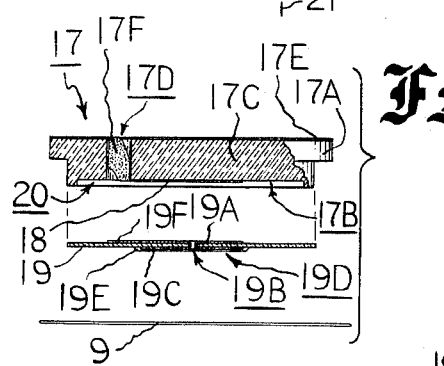
FIG. 4A is a side elevational view, partly in cross section, of two unassembled parts of a ceramic capsule unit for the improved manometer, in association with a portion of a metal diaphragm.

However, not only is electrode structure 17 distinctively different in respect of its composite construction, but its mode of cooperative functioning, mechanically and electrically, with the usual sensor diaphragm, 9, is unique as well. Specifically, composite electrode structure 17 forms a shallow generally-cylindrical capsule in which there is a separate internal variable capacitor whose two spaced planar capacitor electrodes 18 and 19A appear as thin metallic films respectively on the bottom recessed surface 17B of the rigid ceramic capsule member 17C and on the top of a relatively thin and elastically deformable ceramic disc-like capsule member 19(FIG. 4A). The capsule parts supporting those two capacitor electrodes are always exposed to the same near-vacuum reference pressure, because sealed diaphram 9 isolates them from pressures appearing at measurement sites, and because pressure within the inner cavity 20 formed between the rigid upper capsule member 17C and the securely-attached disc-like lower capsule member 19 is the same as the reference pressure, as will always be equalized via the capsule holes 17D and 19B. Therefore, although the capsule elastic disc 19 has the thin flat configuration of a pressure-responsive diaphragm, it does not behave in an expected way, inasmuch as it experiences no pressure differentials; instead, it is a member actuated by mechanically-applied force and may be deflected closer to the electrode 18 when the nearby elastic diaphragm 9 is sufficiently distended by sensed pressures below it to engage it and physically move it in an upward direction referenced to the central longitudinal axis 21—21 of the transducer (FIG. 1).

Figure 3:
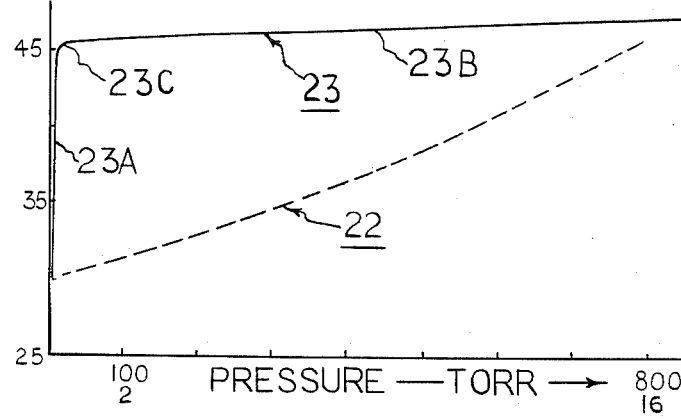
FIG. 3 represents in graphical form, and on two scales, the capacitance vs. pressure characteristics of an improved manometer constructed in accordance with the present teachings.

As the pressure appearing at a measurement site, and appearing also at inlet 10, change between an extremely low pressure near 0 Torr and some higher value, such as About 10 Torr, in a low measurement range of special interest, the capacitance exhibited between electrode surfaces offered by sheet-metal diaphragm 9 and electrode surfaces formed by the nearby metallic bottom electrode film 19C on disc 19, the transducer output capacitance varies rather uniformly about as shown by dashed-line curve 22 in FIG. 3 (in picofarads). That output capacitance represents a combination (summation) primarily of a first capacitance between electrode surfaces offered by diaphragm 9 and film electrode surface 19C, which over that low range tends to be a relatively large varying quantity, and the further capacitance between the electrode surfaces formed by the capsule's film electrodes 19A and 18, which over that same low range tends to remain substantially fixed and not so great as to mask the variations exhibited by the first capacitance. When some relatively low upper end of the low measurement range of special interest is reached, built-in physical parameters of the described transducer insure that the top central part of circular diaphragm 9 will first physically engage the bottom central part of the capsule structure 17 and will thereafter flex its disc 19 upwardly closer toward electrode 18 as pressures increase still further. Ultimately, when atmospheric pressure is reached, the flexible disc will have been pressed upwardly to substantially a maximum needed extent by the diaphragm, and the reduced space then appearing between its upper electrode film 19A and the fixed electrode 18 will result in a maximum combined output capacitance being displayed by the transducer. On another and broader scale, in FIG. 3, curve 23 characterizes the transducer output capacitance, which rises sharply over the low measurement range of interest, as shown along curve expanse 23A, and more slowly over the upper range which rises to and through atmospheric pressure (about 760 Torr), as shown along curve expanse 23B. The "knee" region 23C represents the transition when sheet-metal diaphragm 9 engages and starts to bottom-out against the capsule 17.

Figure 5A:
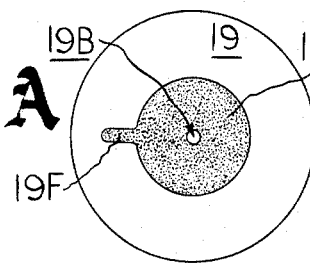
FIG. 5A is a top plan view of the thin and flexible diaphragm-type disc electrode portion of the capsule unit of FIG. 4A.
Figure 5B:
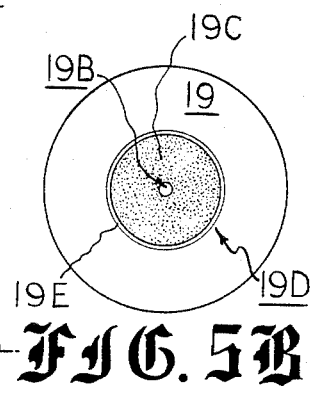
FIG. 5B is a bottom plan view of the same disc electrode portion of the capsule unit.

Such bottoming-out tends to be somewhat critical because interfacing engagements and disengagements of the metal diaphragm and capsule can involve undesirable "hysteresis" (i.e., are not always precisely the same for the same pressure changes); unavoidable roughness of the engaged capsule surfaces contributes to that problem, and improvement is realized when the area of contact is intentionally kept small, rather than being allowed to spread over most of the exposed bottom surface of the capsule. That small area of contacting also develops a preferred deflection characteristic for the disc 19, and a convenient way of promoting the desired effects is by fashioning a shallow but nevertheless protruding "button" 19D at the bottom of the capsule disc. Flexible insulating disc 19 is preferably of ceramic material, such as alumina, having known usefulness in prior capacitance-manometer structures, and the same is true of the cooperating shouldered rigid capsule part 17 with which it is integrally united about its periphery. The materials and bonding techniques involved with such ceramics are well established in the art and are therefore not elaborated upon here; the same is true also of the formation of the metallic film-thickness electrodes which appear on their various surfaces. The aforementioned flat insulating "button" or protrusion 19D may comprise a separate thin circular ceramic or glass member bonded to underside of disc 19, or, as illustrated, it may be in the form of a fired-glass glaze coating 19F. Preferably, the central circular electrode coatings 19A and 19C on disc 19 are about the same size and are relatively small in relation to the overall disc diameter, such as about one-third, or typically about one-half inch in diameter relative to an effective disc diameter of about one-and-one-half inches; the desirably smooth glaze coating 19E of the "button" 19D just overlies the lower electrode film 19C (FIG. 5B). The small (typically 1/16 inch) center hole 19B through disc 19 allows for the metallic film coatings forming upper electrode surfaces 19A and lower electrode surfaces 19C to be electrically joined by a like and simultaneously-deposited metallic film which extends through that hole. Many of the advantages of the improved transducer may be realized if only top electrode surfaces such as 19A are used, because a ceramic disc 19 of alumina has a very high dielectric constant (about 9.5, vs. 1 for a vacuum) and thus acts as though it were only about 1/10th its actual small thickness of about only 0.045 inch. However, it currently appears to be a better practice to have the lower electrode surfaces 19C in place to form the main sensitive-range capacitance with electrode surfaces of the metal diaphragm 9; the glaze 19E of course prevents any electrical shorting of that diaphragm with electrode surfaces 19C when they engage and the diaphragm bottoms out while forcing flexible disc upwardly under higher-pressure measurement conditions.

Figure 4B:
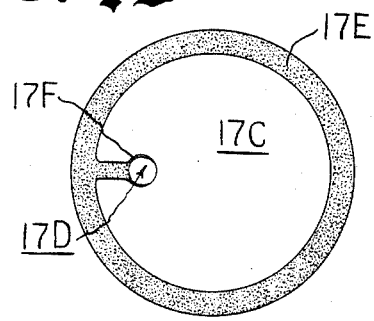
FIG. 4B provides a top plan view of the rigid upper-electrode portion of the capsule unit of FIG. 4A.
Figure 4C:
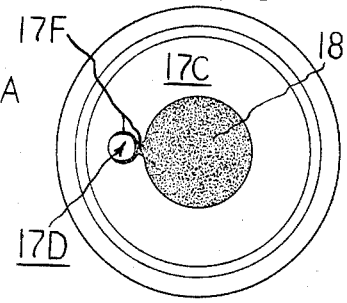
FIG. 4C supplies a bottom plan view of the same upper-electrode portion.

The electrode surfaces formed by sheet-metal diaphragm 9 are electrically as well as physically joined with the transducer metal housing or body parts 7 and 8, as by peripheral welding, and they are also caused to have good electrical connection with the upper inner capsule electrode 18, by way of a plated metallic ring 17E (FIG. 4B) around the upper peripheral surface of the rigid ceramic shoulder 17A. That ring is joined with electrode surfaces 18 by a plate-through 17F traversing the hole 17D in capsule membr 17, and it finds electrical connection with the transducer body, along with diaphragm 9, through conductive paths such as those provided by the overlying solid spacer-washer 24 and springy metal wovewasher 25, both interposed between shoulder ring 17E and the metallic cover 11 (FIG. 1) which is welded to body part 7 when the transducer assembly is about to be completed. Both the diaphragm 9 and the rigidly-positioned electrode 18 form the aforementioned important variable-capacitance relationships with the joined disc electrodes 19C and 19A, respectively, and it is of course necessary that there be a secure and separate electrical connection with those joined electrodes; internal conductive spring 14A, associated with the externally-accessible output lead 14, supplies such as connection by engaging and making good contact with a plated conductive radial tab 19F (FIG. 5A) which is integral with and simultaneously deposited with the disc electrode 19A (and 19C). For that purpose, contact spring 14A must reach tab 19F through capsule member 17 without connecting with any of the metallic plating associated with its electrode 18 and connection ring 17 and plate-through 17F, and it does so by passing freely through the relatively large accommodating hole 17D and pressing firmly against tab 19F.

Upper electrode 18, on the inside of capsule 17, is of substantially the same configuration and size as the cooperating parallel lower inner capsule electrode 19A, and the normal spacing between them, when the disc element 19 is undeflected, is typically only very small, such as about the order of a few thousandths (example: 0.008 inch). That spacing is determined essentially by the depth of the capsule cavity 20, the film electrodes themselves being exceedingly thin. An even closer normal spacing between the undeflected diaphragm 9 and the capsule electrode surfaces 19C above it is preserved by appropriate dimensions affecting confronting external surfaces of the capsule and internal shoulder surfaces of the transducer body 7, aided as may be necessary by an auxiliary washer-like shim 26 (FIG. 1).

In other constructions, the plated film-like electrodes may instead involve thicker and/or specifically-different conductive regions of material, and the capsule may incorporate a sheet-metal diaphragm-type member rather than a ceramic disc. Flexible lead wire may be employed in place of the illustrated contact spring, and an accommodating opening for its passage into the interior of the capsule may be separate from the plated lead-through. Separate leads may bring out the two variable capacitances independently, where appropriate. A fluid fill, such as one of silicone, may be employed to promote good deflection of the capsule disc by the main diaphragm. Further, the same principles and features of construction may be applied in capacitive pressure sensors other than those of the absolute type. Accordingly, it should be understood that the specific embodiments and practices described in connection with this specification have been presented by way of disclosure rather than limitation and that various modifications, combinations and substitutions may be effected by those skilled in the art without departure either in spirit or scope from this invention in its broader aspects and as set forth in the appended claims.

What we claim as new and desire to secure by Letters Patent of the U.S. is:

1. Capacitive pressure transducer apparatus having a diaphragm in fluid-tight separating relation to regions exhibiting different fluid pressure conditions, said diaphragm including electrically-conductive capacitor electrode surfaces movable therewith, and composite capacitor means disposed in one of said regions, said composite capacitor means including a flexible member having electrically-conductive capacitor electrode surfaces movable therewith in closely-spaced relation to said electrode surfaces of said diaphragm and forming a first variable capacitor therewith, and a relatively rigid member mounting relatively stationary electrically-conductive capacitor electrode surfaces in spaced relation to said electrode surfaces of said flexible member and forming a second variable capacitor therewith, and means mounting said composite capacitor means in position relative to said diaphragm for said diaphragm to physically deflect said flexible member in response to and by amounts related to differences in pressures between said regions beyond a predetermined range, whereby said first variable capacitor exhibits cpacitances related to said differences in pressures within said predetermined range and said second variable capacitor exhibits capacitances related to differences in pressures beyond said range.

2. Capacitive pressure transducer apparatus as set forth in claim 1 wherein said diaphragm comprises a sheet-metal member with said conductive electrode surfaces thereof on its side exposed to said one of said regions, and including means preserving said one of said regions at a low reference pressure, and means applying measured pressures to the other of said regions.

3. Capacitive pressure transducer apparatus as set forth in claim 2 wherein said one of said regions is substantially evacuated and maintained at a near-vacuum condition, and wherein said predetermined range is of differences in pressures between those in said one of said regions under said near-vacuum condition and those in said other of said regions extending from near vacuum up to a maximum low pressure of measurement interest, and wherein said second variable capacitance exhibits measurable capacitances related to pressures at atmospheric levels appearing in said other of said regions.

4. Capacitive pressure transducer apparatus as set forth in claim 1 wherein said diaphragm comprises a sheet-metal member with said conductive electrode surfaces thereof on its side exposed to said one of said regions, and insulating means electrically separating said conductive electrode surfaces of said diaphragm from conductive electrode surfaces of said flexible member when said diaphgram engages and physically deflects said flexible member in response to said differences in pressures beyond said predetermined range.

5. Capacitive pressure transducer apparatus as set forth in claim 4 wherein said composite capacitor means includes as said flexible member a relatively thin and flat flexible insulating disc whose said capacitor electrode surfaces are formed by conductive metal thinly layered thereon, and said rigid member includes a hard body of insulating material whose said capacitor electrode surfaces are formed by conductive metal thinly layered on a substantially-planar face thereof which is oriented in a closely-spaced substantially parallel relation to said disc.

6. Capacitive pressure transducer apparatus as set forth in claim 5 wherein said composite capacitor means is in the form of a hollow capsule with said flexible disc and hard insulating body united peripherally in a fixed relation with an internal cavity defined therebetween, capacitor electrode surfaces of said disc and said insulating body being in confronting relation to one another across said internal cavity and thereby forming said second variable capacitor.

7. Capacitive pressure transducer apparatus as set forth in claim 6 wherein said insulating disc and said insulating body are of ceramic material, wherein said capacitor electrode surfaces are plated onto said ceramic material, and further comprising means electrically connecting said capacitor electrode surfaces of said diaphragm and of said insulating body, whereby total capacitance exhibited between said capacitor electrode surfaces of said disc and the interconnected surfaces of said diaphragm and insulating body is essentially the sum of the capacitances of said first and second variable capacitors.

8. Capacitive pressure transducer apparatus as set forth in claim 7 wherein said disc and insulating body have circular outlines and united together impart a substantially cylindrical form to said hollow capsule, wherein said capacitor electrode surfaces of said capsule are substantially circular and central to said disc and insulating body, the diameters of said circular electrode surfaces being substantially the same, and wherein the spacing between said electrode surfaces of said insulating body and the undeflected disc is greater than the spacing between said undeflected disc and undeflected diaphragm.

9. Capacitive pressure transducer apparatus as set forth in claim 7 wherein said disc and insulating body have circular outlines and united together impart a substantially cylindrical form to said hollow capsule, wherein said capacitor electrode surfaces of said capsule are substantially circular and central to said disc and insulating body, and wherein said electrode surfaces of said disc include further plated surfaces on the side of said disc adjacent to said diaphragm, said insulating means being disposed between said further plated surfaces and said diaphragm.

10. Capacitive pressure transducer apparatus as set forth in claim 9 wherein said thin disc has an opening therethrough, wherein the same material plated to form said electrode surfaces on both sides of said disc is plated through said opening in an electrically interconnecting relation with said electrode surfaces on both sides of said disc, and wherein said electrode surfaces on both sides of said disc are of substantially the same diameter.

11. Capacitive pressure transducer apparatus as set forth in claim 10 wherein said insulating means comprises a relatively thin insulating glaze over said electrode surfaces on the side of said disc adjacent to said diaphragm.

12. Capacitive pressure transducer apparatus as set forth in claim 11 wherein the diameter of said electrode surfaces is about one-third the diameter of said insulating disc, wherein said disc and insulating body are of alumina, and wherein said glaze is of a glass and forms a flat thin button-like protrusion of diameter slightly in excess of the electrode surfaces on the side of said disc adjacent to said diaphragm.

13. Capacitive pressure transducer apparatus as set forth in claim 9 wherein said electrode surfaces on the side of said disc confronting said internal cavity merge with a relatively narrow radial conductive tab integral therewith, wherein said insulating body has at least one opening therethrough into said internal cavity and aligned with said radial tab on said disc, and further including a flexible electrical contact extending from said radial tab and out of said internal cavity through said opening in said insulating body.

14. Capacitive pressure transducer apparatus as set forth in claim 13 including a further conductive electrical contact plated on the exterior of said insulating body and extending through said opening in said insulating body and electrically united with said electrode surfaces of said insulating body inside said cavity, said flexible electrical contact extending through said opening in said insulating body without engaging the plating therethrough.

15. A method for capacitively characterizing pressures over a wide range which comprises subjecting opposite sides of a diaphragm to pressures appearing in different regions sealed apart by the diaphragm and thereby causing related deflections thereof, establishing a first variable capacitance between first capacitor electrode surfaces movable with the diaphragm and second capacitor electrode surfaces carried by a flexible insulating member in one of said regions, and establishing a second variable capacitance between the second capacitor electrode surfaces and third capacitor electrode surfaces while holding said third electrode surfaces fixedly in position in the said one of said regions, said step of establishing the second variable capacitance involving physically deflecting the flexible insulating member in accordance with deflections of the diaphragm when the diaphragm deflections exceed a predetermined amount.

16. A method for capacitively characterizing pressures as set forth in claim 15 which comprises maintaining a substantially evacuated condition in the said one of said regions and exposing the other of said regions to pressures to be measured in terms of absolute pressure, and wherein said step of establishing the second variable capacitance involves physically deflecting electrode surfaces of said flexible member through electrical insulation which prevents electrical connection of the first and second electrode surfaces, and further comprising additively combining the first and second variable capacitance to capacitively characterize the pressures in the other of said regions in terms of absolute pressure.

* * * * *